United States Patent
Wall

(10) Patent No.: US 10,852,417 B2
(45) Date of Patent: Dec. 1, 2020

(54) INDOOR LOCATION AND TRACKING SYSTEM

(71) Applicant: Scott Technologies, Inc., Monroe, NC (US)

(72) Inventor: Brian Davidson Wall, Raleigh, NC (US)

(73) Assignee: Scott Technologies, Inc., Monroe, NC (US)

( * ) Notice: Subject to any disclaimer, the term of this patent is extended or adjusted under 35 U.S.C. 154(b) by 263 days.

(21) Appl. No.: 15/777,991

(22) PCT Filed: Nov. 23, 2016

(86) PCT No.: PCT/US2016/063566
§ 371 (c)(1),
(2) Date: May 22, 2018

(87) PCT Pub. No.: WO2017/091711
PCT Pub. Date: Jun. 1, 2017

(65) Prior Publication Data
US 2018/0348359 A1    Dec. 6, 2018

Related U.S. Application Data

(60) Provisional application No. 62/259,766, filed on Nov. 25, 2015.

(51) Int. Cl.
| | |
|---|---|
| G01S 13/84 | (2006.01) |
| G01S 13/87 | (2006.01) |
| G01S 13/88 | (2006.01) |
| G01S 13/82 | (2006.01) |
| G01S 7/35 | (2006.01) |
| G01S 5/02 | (2010.01) |

(52) U.S. Cl.
CPC .......... *G01S 13/84* (2013.01); *G01S 7/352* (2013.01); *G01S 13/825* (2013.01); *G01S 13/878* (2013.01); *G01S 13/88* (2013.01); *G01S 5/0231* (2013.01)

(58) Field of Classification Search
CPC ........ G01S 13/84; G01S 13/825; G01S 7/352; G01S 13/878; G01S 13/88; G01S 5/0231
USPC .......................................................... 342/42
See application file for complete search history.

(56) References Cited

U.S. PATENT DOCUMENTS

| | | |
|---|---|---|
| 4,757,315 A | 7/1988 | Lichtenberg |
| 5,691,922 A * | 11/1997 | McEwan ................ G01S 13/84 |
| | | 700/91 |
| 5,977,913 A | 11/1999 | Christ |
| 7,751,829 B2 | 7/2010 | Masuoka |
| 8,174,931 B2 | 5/2012 | Vartanian |
| 8,259,692 B2 | 9/2012 | Bajko |

(Continued)

OTHER PUBLICATIONS

International Search Report for PCT/US2016/063566 dated Mar. 16, 2017 (3 pages).

*Primary Examiner* — Frank J McGue

(57) ABSTRACT

A system, method and device for tracking at least one of objects, vehicles and personnel at a scene by determining a distance between a first node and a remote node are disclosed. In some embodiments, a method is provided for tracking emergency responders at an emergency incident scene by determining a distance between nodes positioned on the emergency responders and enabling mapping of the relative positions of the emergency responders.

18 Claims, 6 Drawing Sheets

(56) References Cited

U.S. PATENT DOCUMENTS

| | | |
|---|---|---|
| 8,279,840 B2 | 10/2012 | Walker, Sr. |
| 8,289,152 B1 | 10/2012 | Greenberger |
| 8,340,022 B2 | 12/2012 | Lee |
| 8,350,758 B1 | 1/2013 | Parvizi |
| 2001/0054471 A1* | 12/2001 | Kelch ................. B23B 31/1179 156/85 |
| 2004/0033808 A1 | 2/2004 | Rorabaugh |
| 2004/0054471 A1 | 3/2004 | Bartlett |
| 2008/0143584 A1* | 6/2008 | Shoarinejad .......... G01S 13/751 342/127 |
| 2009/0027272 A1* | 1/2009 | Don Carlos ......... G01C 21/206 342/442 |
| 2016/0066137 A1* | 3/2016 | Kulkarni .................. G01S 3/28 455/456.1 |

* cited by examiner

INDOOR LOCATION AND TRACKING SYSTEM

CROSS REFERENCE TO RELATED APPLICATIONS

This application is a national stage filing under 35 U.S.C. 371 of PCT/US2016/063566, filed 23 Nov. 2016, which claims the benefit of U.S. Provisional Patent Application No. 62/259,766, filed 25 Nov. 2015, the disclosures of which are incorporated by reference in their entirety herein.

TECHNICAL FIELD

This disclosure is related location determination and tracking, and more specifically to indoor location determination and tracking.

BACKGROUND

Firefighter and first responder safety improves when all personal on location can see, in real time, the location and movement of other personal. Such a system is especially valuable in the event that a fire fighter becomes lost, disoriented, or injured while inside a burning building. The ability to monitor the movement of personal within a building or other structure is valuable to the incident commander.

Most existing locating systems rely on beacons and/or sensors which must be set up in the area of interest before locating devices are deployed. Other systems rely on global positioning system (GPS) signals for tracking. While GPS based systems don't require equipment set-up, they have limited effectiveness indoors. There is a need for a tracking system that can track the location of fire fighters and/or other emergency personal at an incident location.

SUMMARY

Some embodiments advantageously provide a method and system for tracking at least one of objects, vehicles and personnel at a scene by determining a distance between a first node and a remote node. According to one aspect, a method includes transmitting a first signal from the first node, the first signal having a wavelength longer than a distance between the first node and the remote node. The method also includes receiving at the first node a return signal received from the remote node. The method also includes generating a second signal, the second signal having a frequency that is a multiple of a frequency of the first signal, the second signal being synchronized with the first signal and being phase-locked to the received return signal. The method also includes comparing the second signal to the return signal to produce a distance determination signal that represents a distance between the first node and the remote node. The method further includes determining the distance between the first node and the second node based on the produced distance determination signal.

According to this aspect, in some embodiments, the produced distance determination signal has a number of pulses that represent a number of high frequency wavelengths between the first node and the remote node. In some embodiments, one pulse of the number of pulses has a fractional width representing an incremental distance between the first node and the remote node, the incremental distance being less than a wavelength of the second high frequency signal. In some embodiments, the method further includes using the determined distance to determine a position of the first node based on known locations of the remote node and at least one other node. In some embodiments, the method further includes determining an acceleration of the first node based on signals. In some embodiments, the method further includes determining a heading and velocity of the first node based on sensor data from an accelerometer, gyroscope sensor or compass. In some embodiments, the method further includes determining an acceleration, heading and velocity of the first node based on data from an accelerometer, gyroscope and compass. In some embodiments, the first node is affixable to a first emergency responder and the remote node is affixable to a second emergency responder.

According to another aspect, a first node for use in tracking at least one of objects, vehicles and personnel at a scene by determining a distance between the first node and a remote node is provided. The first node includes a transceiver configured to transmit a first signal from the first node, the first signal having a wavelength longer than a distance between the first node and the remote node and receive a return signal from the remote node. The first node also includes a signal generator configured to generate the first signal and generate a second signal such that the second signal has a frequency that is a multiple of a frequency of the first signal and the second signal is synchronized with the first signal and being phase-locked to the received return signal. The first node also includes processing circuitry including a memory and a processor. The memory is configured to store a distance between the first node and the remote node. The processor is configured to compare the second signal to the received return signal to produce a distance determination signal that represents a distance between the first node and the remote node. The processor is also configured to determine the distance between the first node and the second node based on the produced distance determination signal.

According to this aspect, in some embodiments, the produced distance determination signal has a number of pulses that represent a number of high frequency wavelengths between the first node and the remote node. In some embodiments, one pulse of the number of pulses has a fractional width representing an incremental distance between the first node and the remote node, the incremental distance being less than a wavelength of the second high frequency signal. In some embodiments, the processor is further configured to use the determined distance to determine a position of the first node based on known locations of the remote node and at least one other node. In some embodiments, the first node further includes an accelerometer configured to determine an acceleration of the first node. In some embodiments, the first node further includes a gyroscope configured to determine an orientation of the first node. In some embodiments, the first node further includes a compass configured to determine a heading of the first node. In some embodiments, the processor is further configured to update the position of the first node based on the acceleration and heading. In some embodiments, the first node is positioned on a first emergency responder and the remote node is positioned on a second emergency responder. In some embodiments, the processor implements exclusive-OR and AND logic to produce the distance determination signal. In some embodiments, the processing circuitry includes a signal generator configured to generate the first and second signals.

According to yet another aspect, a system deployable for use in tracking emergency responders at an emergency incident scene by determining a mapping of the positions of the emergency responders is provided. The system includes a plurality of locator nodes distributable among a plurality of emergency responders, each locator node configured to determine its own position and distance from at least two other locator nodes, the system includes at least one user interface configured to display a map of the positions of the locator nodes.

According to this aspect, in some embodiments, a locator node determines its position based on a distance of the locator node to a first remote locator node and a second remote locator node. In some embodiments, a locator node determines a distance to a remote locator node by measuring a phase shift, the phase shift indicative of a round trip delay of a low frequency signal from the locator node and the remote locator node, the measuring involving comparison of a high frequency signal and the delayed low frequency signal. In some embodiments, the locator node includes a transceiver configured to transmit a first signal from the first node, the first signal having a wavelength longer than a distance between the first node and the remote node and to receive a return signal from the remote node. The locator node may further include a signal generator configured to generate the first signal and generate a second signal, the second signal having a frequency that is a multiple of a frequency of the first signal, the second signal being synchronized with the first signal and being phase-locked to the received return signal. The locator node includes processing circuitry including a memory and a processor. The memory is configured to store a distance between the first node and the remote node. The processor is configured to compare the second signal to the received return signal to produce a distance determination signal that represents a distance between the first node and the remote node. The processor is further configured to determine the distance between the first node and the second node based on the produced distance determination signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
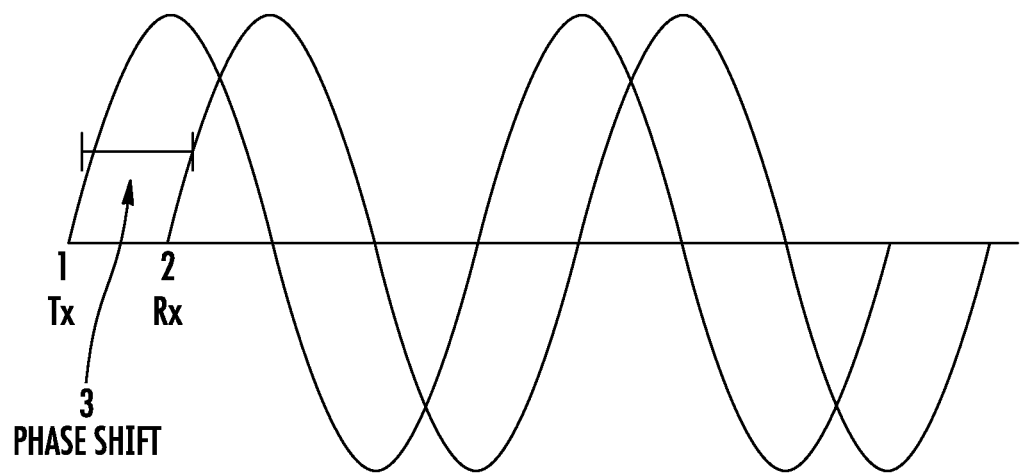
FIG. 1 is a diagram of two sine waves differing in phase.

Before describing in detail exemplary embodiments, it is noted that the embodiments reside primarily in combinations of apparatus components and processing steps related to tracking emergency responders at an emergency incident scene. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments include a system of locator nodes, which can be attached to emergency responders or equipment of emergency responders such that the location of each can be determined relative to the location of other devices in the system. The system forms a tracking network. Each of the locator nodes maintains and updates information about its location relative to other locator nodes by periodically measuring the distance between itself and other nodes. Optionally, one or more of the locator nodes may be placed in a known location to provide a fixed point of reference. However, a fixed point of reference is not required because each locator node maintains its location relative to the other locator nodes in the system and not the location of a known reference point.

The system is able to maintain and update location information of the other locator nodes, and the locator nodes' movement, even when locator nodes are inside a building or other environment where GPS signals are not available. Each locator node is wirelessly connected to each of the other locator nodes by a local area network such as Wi-Fi or Zigbee. This allows each locator node to share its location information with other locator nodes in the system. Each locator node tracks its own movement and updates its location relative to other moving and/or fixed position locator nodes in the system. In order to maintain accurate information about location, each node periodically measures the distance between itself and other locator nodes in the system. Accurate distance measurements are accomplished with radio transceivers in each locator node by measuring round trip radio wave phase shift. This arrangement is discussed in detail below. Each locator node in the system can update its location relative to nearby locator nodes based on location information the locator node receives over a wireless local area network and distances measured to the nearby locator nodes.

The method for measuring distance is based on the fact that a radio signal shifts in time as the distance between the locator nodes changes. At any given point on the path of the wave, the amplitude is moving up and down as time passes. Because the wave is constantly moving, the shift cannot be measured without a reference. To solve the problem of needing a reference, a signal is sent to a remote locator node and back, resulting in two signals. These two signals include the transmitted signal and the signal that has made a round trip to a remote location and back. If the original signal is used as a reference and compared to the signal that has made a round trip, a phase shift will be observed.

Referring now to the drawings in which like reference designators refer to like elements, FIG. 1 is a diagram showing multiple waveforms used to explain a principle of the present disclosure. In FIG. 1, waveform 1 (labeled Tx) is the original signal and waveform 2 (labeled Rx) is the signal that has made a round trip. As seen in FIG. 1, the round trip waveform (waveform 2) is shifted to the right. This shift is proportional to the distance the wave has traveled. As the remote locator node moves farther away, the shift becomes greater. As waveform 2 is continually shifted relative to waveform 1, the two waveforms eventually get to the point where they line up with each other again. The point at which the two waveforms line up, and make it appear like there is no shift, occurs when waveform 2 has traveled a distance of one wavelength. In order to measure longer distances without losing the shift, a waveform with a very long wavelength relative to the distance should be selected. The downside to using a very long wavelength is that it is difficult to measure small changes in distance. To solve this problem, a signal with a short wavelength is synchronized to the signal that has made the round trip. The shift in the new short wavelength (high frequency) signal is used to make accurate measurements of small changes in distance.

Some embodiments provide real time tracking and location mapping of personal, such as indoors, without the need for beacon and/or sensor setup or prior knowledge of the building. Location information is maintained in each locator node by accurately measuring distances between the locator nodes. As seen in FIG. 1, the phase shift 3 between an originating locator node's transmission signal 1 and the signal 2 returned by a remote locator node changes as the distance between the two locator nodes change.

Figure 2:
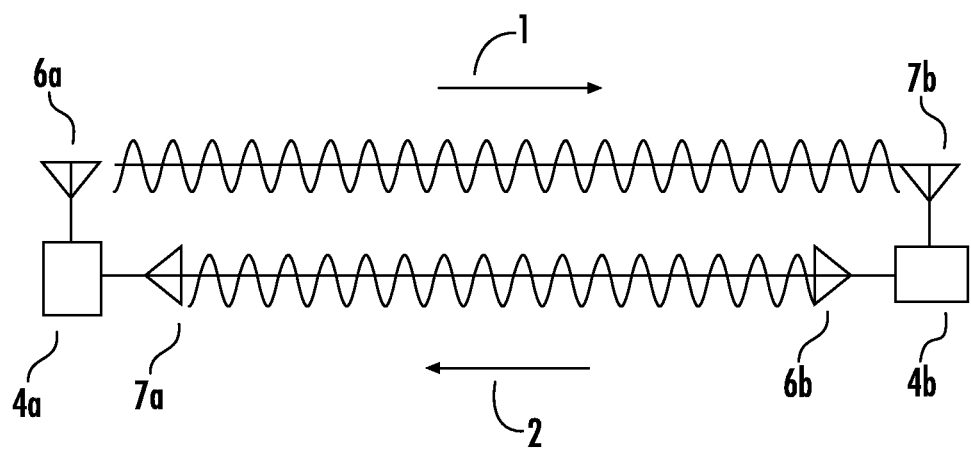
FIG. 2 is a diagram of two locator nodes in wireless communication.

FIG. 2 is a diagram showing two locator nodes 4a and 4b, referred to collectively herein as locator nodes 4. As seen in FIG. 2, distance between locator nodes 4 can be determined by measuring the phase shift 3, as shown in FIG. 1, in a radio wave that has made a round trip from an originating locator node 4a to a remote locator node 4b and back. For example, the originating locator node 4a may be any locator node in the system that starts transmitting a radio signal and instructs another locator node 4b to return the signal by identifying that locator node 4b over a wireless network, such as for example without limitation Wi-Fi, Zigbee, or other wireless network. The remote locator node 4b is any locator node in the system that receives instruction to send back the distance measuring radio signal to the originating locator node 4a. While the originating locator node 4a is broadcasting the distance measuring signal 1 it simultaneously receives a copy 2 of the same signal that is being returned by the remote locator node 4b. The originating locator node 4a can then compare the outgoing waveform with the waveform being received from the remote locator node 4b. The phase shift 3 between the two signals 1 and 2, shown in FIG. 1, is related to distance and wavelength of the distance measuring signal as follows:

$$\text{Phase Shift}/360 \times \text{wavelength} = \text{distance}$$

The above equation yields the true distance between the originating locator node 4a and the remote locator node 4b if the distance is less than the wavelength of the measuring signal. Otherwise the phase shift 3 can be compared to the last known distance and phase shift to compute a change from the last known distance between the two locator nodes 4. It should be noted that higher frequency distance measuring signals measures distance with more accuracy. Lower frequencies measure greater distances or differences between measurements. In one embodiment, accurately measuring large distances or distances when no last known value is available can be accomplished by using several different frequencies for the distance measuring signal.

Figure 3:
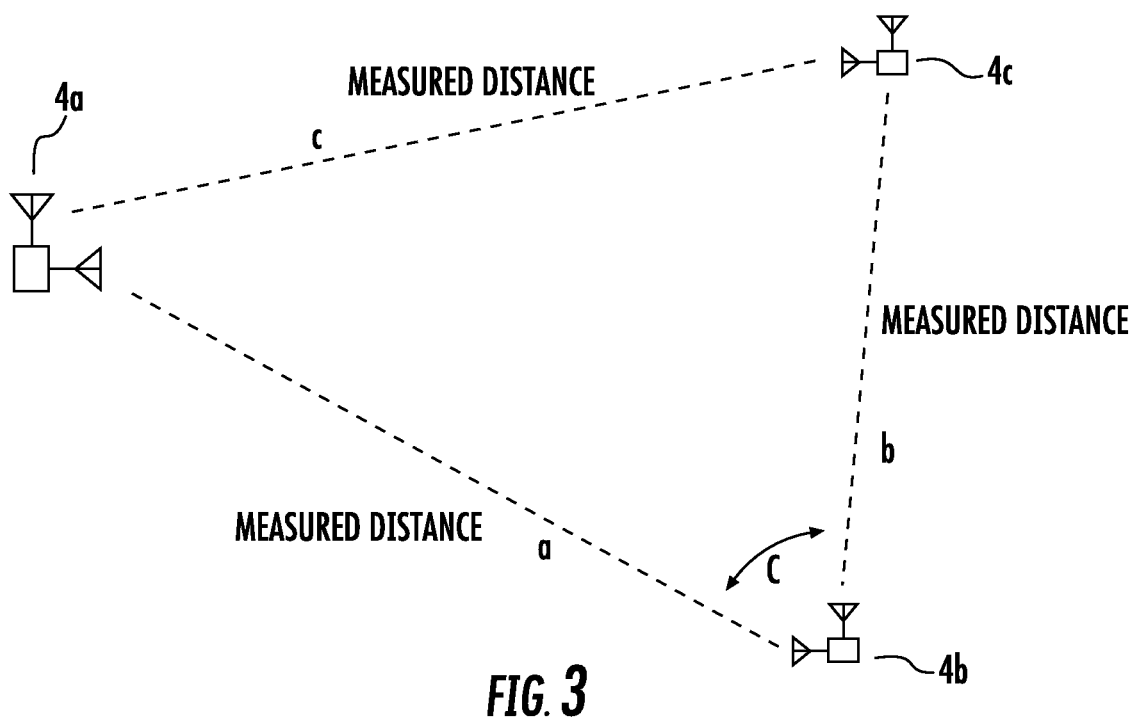
FIG. 3 is a diagram of three locator nodes whose positions are determined by triangulation.

As detailed in FIG. 2, an originating locator node 4a includes a transmit antenna 6a and a receive antenna 7a. The originating node 4a transmits the distance measuring signal 1 using the transmit antenna 6a. The remote locator node 4b includes a transmit antenna 6b and a receive antenna 7b. Remote locator node 4b receives the distance measuring signal 1 at the receive antenna (7b) and retransmits a phase locked distance measuring signal 2 of the same frequency on its transmit antenna (6b). When the originating locator node 4a detects the return signal 2 on its receive antenna 7a, the originating locator node 4a measures changes in the distance between itself and the remote locator node 4b by the phase shift between the transmit signal 1 and the received signal 2. Transmit antennas 6a and 6b are referred to collectively herein as transmit antenna 6, and receive antennas 7a and 7b are referred to collectively herein as receive antenna 7. The originating locator node 4a calculates its location by measuring the distance between itself and two other remote locator nodes 4 as shown in FIG. 3. In FIG. 3 the two remote locator nodes 4b and 4c know their location and have measured the distance between each other. Therefore, the originating locator node 4a determines its position relative to the two remote locator nodes 4b and 4c using trigonometry, discussed below in detail. Locator nodes 4a, 4b and 4c are referred to collectively herein as locators nodes 4.

Referring again to FIG. 2, the originating locator node 4a transmits the distance measuring signal 1 and at the same time receive the return signal 2 from the remote locator node 4b. Simultaneous transmission and reception allow the originating locator node 4a to compare the phase of the two signals relative to each other. There is no need for time synchronization between the originating locator node 4a and the remote locator node 4b. However, the outgoing signal 1 and incoming signal 2 should not interfere with one another. Such interference may be averted by transmitting the outgoing signal 1 with opposite polarization from the incoming signal 2, for example using a horizontally polarized transmit antenna and a vertically polarized receive antenna.

FIGS. 1 and 2 show a continuous wave signal. While a solution using an unmodulated signal will work in the context of the disclosure, there are several drawbacks to using an unmodulated continuous wave signal as the round trip signal. First, each node needs to keep its antennas oriented correctly such that correct polarization could be maintained. A second drawback is that it may be difficult to select a useful round trip signal frequency that did not violate government radio wave emission regulations.

An alternative solution is to use a frequency modulated (FM) transmitter and modulate the distance measuring waveform on a FM carrier. This approach has several advantages over the unmodulated continuous wave round trip signal shown in FIG. 2. First, FM signals are less susceptible to interference from multipath reflection and background noise. This is because of the capture effect of FM receivers where by the strongest signal tends to get captured and locked onto by the receiver and other, lower amplitude, signals are ignored. Second, any suitable FM carrier frequency may be used. The distance measuring frequency is independent of the carrier frequency and a wide frequency range of distance measuring signals could be used to measure very long distances with high accuracy. A further advantage of using a frequency modulated distance signal is that the outgoing transmitted signal and the incoming receive signal can be on different carrier frequencies. This eliminates the possibility of interference between transmit and receive signals of any given node.

When selecting a frequency to use as a distance measuring signal there is a tradeoff to be considered. Lower frequencies will require less bandwidth when modulated onto a carrier, but they have a longer wavelength which makes it harder to measure small changes in distance accurately. Conversely, higher frequencies require more bandwidth but measure small changes in distance well. In addition to the bandwidth consideration, higher frequencies may incorrectly measure large changes in distance. Specifically, a change in distance greater than the wavelength of the distance measuring signal will cause the phase shift to wrap around and the distance measurement may be inaccurate by one or more multiples of the wavelength. In addition, if changes in distance can be greater than one half the wavelength of the distance measuring frequency, then it is not possible to distinguish the difference between positive and negative changes is distance.

When at least two locator nodes in the system have known locations, for example using GPS fixes, all other locator nodes can determine their absolute location based on the distances between themselves and the two known locations using trigonometric calculations. In some embodiments, the system is able to maintain relative location information on all the locator nodes (nodes 4 and 5) even when no known locations are available. Referring to FIG. 3, if the originating locator node 4a measures the distance between itself and two remote locator nodes 4b and 4c and the remote locator nodes 4b and 4c measure the distance between each other, a triangle is formed. Because the length of all the sides of the triangle have been measured, the angles of the triangle can be obtained using the law of cosines. The formula for this is as follows:

$$a^2+b^2-2ab\cos(C)=c^2$$

where a, b and c are the sides of the triangle, and the angle C is the angle formed by sides a and b.

In order to gain further information about its location relative to other locator nodes 4 in the system, each locator node 4 is preferably equipped with one or more of a magnetic compass, an accelerometer and a gyroscope. A locator node 4 can then gain additional location information about its position, relative to other locator nodes 4 in the system, by considering its heading and acceleration and its relative distances to other nearby locator nodes 4. Heading and velocity information for all nodes can be used to rotate the mapped nodes to the correct orientation.

Figure 4:
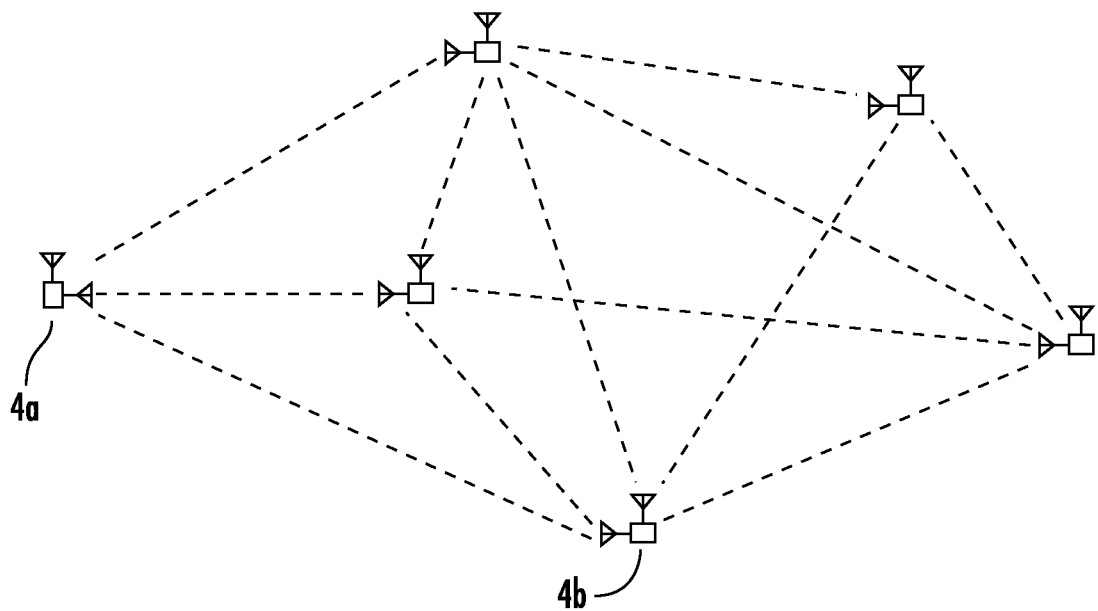
FIG. 4 is a diagram of a plurality of locator nodes in communication.

In some embodiments, each locator node 4 continually updates its location relative to other locator nodes 4 in the system. All locator nodes 4 may share their current location with other locator nodes 4 in the system over the wireless LAN. Examples of wireless LAN technologies that can be implemented herein include, but are not limited to, BLUETOOTH, Zigbee, and IEEE 802.11, i.e., Wi-Fi. This allows each locator node 4 to maintain a map of all locator nodes 4 in the system. In alternative embodiments, only one or some of all the locator nodes 4 may have a mapping capability. FIG. 4 shows the system depicted in FIG. 3 after additional locator nodes 4 have been added. FIG. 4 shows that as more and more locator nodes 4 are added to the system, more triangles are formed. This provides more measurements and angles and thus more information about the relative position of each locator node 4. It should be noted that this relative position based on the distance and angles of the triangles formed works even when all the locator nodes are not in the same plane. Therefore, we can map relative positions in a three dimensional space. This could be useful when all the locator nodes 4 are not on the same floor of a building.

Figure 5:
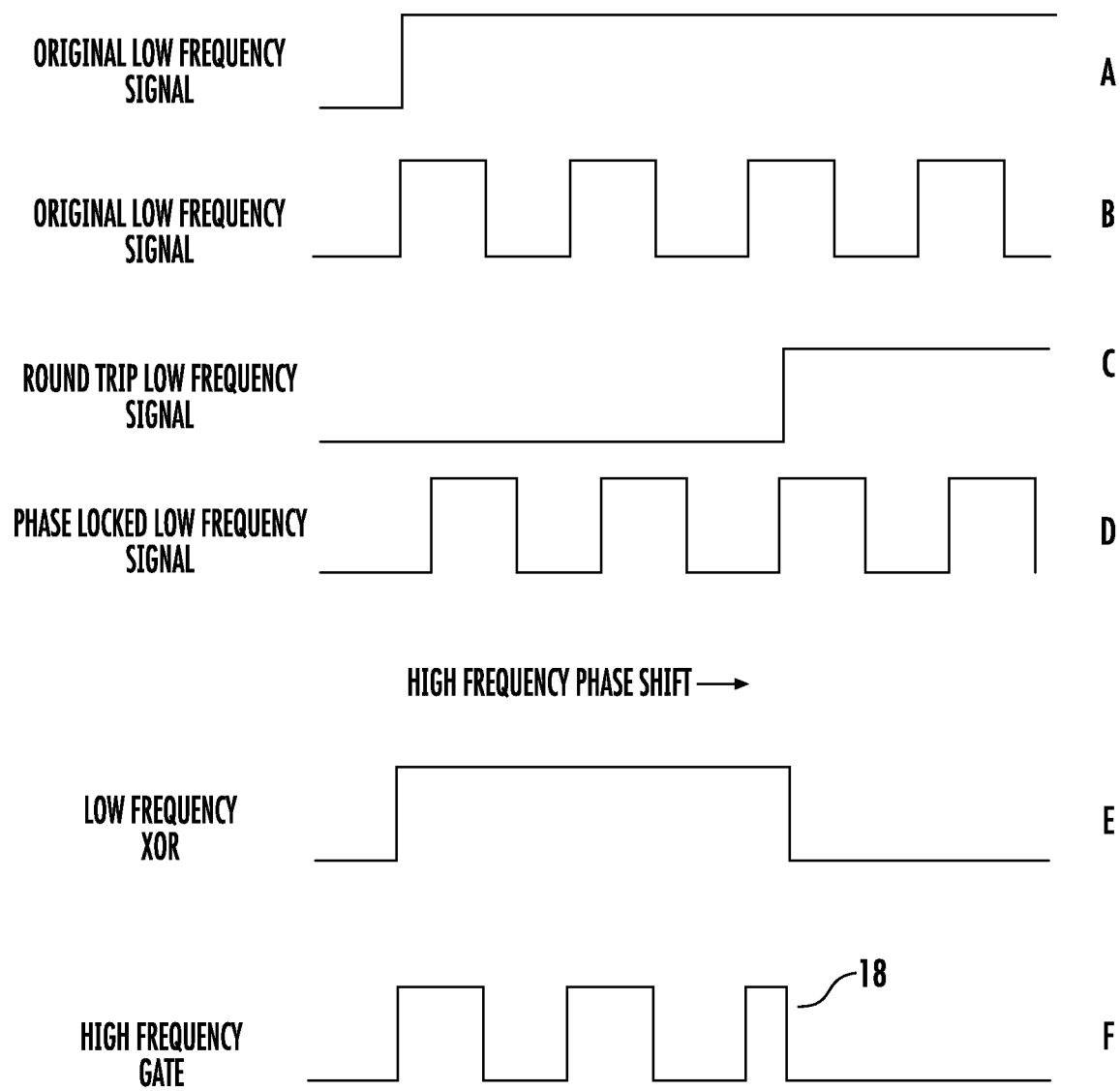
FIG. 5 is a diagram of signals of a locator node.

FIG. 5 shows a group of waveforms used to explain the distance measurement principles of the embodiments of the disclosure. The limitations and bandwidth requirements for using phase shift to measure distance are overcome by using two distance measuring signal frequencies, as seen in FIG. 5, signals A and B. A high frequency (signal B) is chosen such that it can accurately and easily measure small changes in distance using low cost hardware to detect phase shift. As used herein, high frequency is one whose wavelength is a fraction of the distance between the originating locator node and the remote locator node. In order to reduce bandwidth requirements and solve the problem of the distance measurement wrapping around every wavelength or 360 degrees of phase shift a low frequency (signal A) is selected, as seen in FIG. 5. As used herein, a low frequency is one whose wavelength is longer than the distance between the originating locator node and the remote locator node.

In some embodiments, the high frequency signal has a frequency that is an integer multiple of the low frequency signal. Both signals are generated by a common clock such that they are synchronized. In order to reduce bandwidth requirements, only the low frequency distance measuring signal is sent to the radio of the remote locator node to be modulated on the radio frequency (RF) carrier. This low frequency signal makes a round trip to the remote locator node and back to the originating locator node (signal C).

The high frequency signal is used to accurately measure small changes in distance even though the high frequency signal did not make a round trip. This is accomplished by generating a new high frequency signal (signal D) and phase locking the new high frequency signal to the distance measuring signal (signal C) that made the round trip to the remote locator node and back, as seen in FIG. 5. This new high frequency signal will be phase shifted when compared to the original high frequency signal, as seen in FIG. 5, signals B and D.

The number of whole wavelengths between the two locator nodes can be measured by first exclusive OR-ing the original low frequency signal with the round trip low frequency to get FIG. 5, signal E. Then, the signal E is logically AND-ed with the original high frequency signal (signal B). The result of this operation is a series of pulses that represent the number of high frequency wavelengths between the two locator nodes as shown in FIG. 5, signal F. The distance measuring signals can be decoded with very inexpensive and simple hardware.

Figure 6:
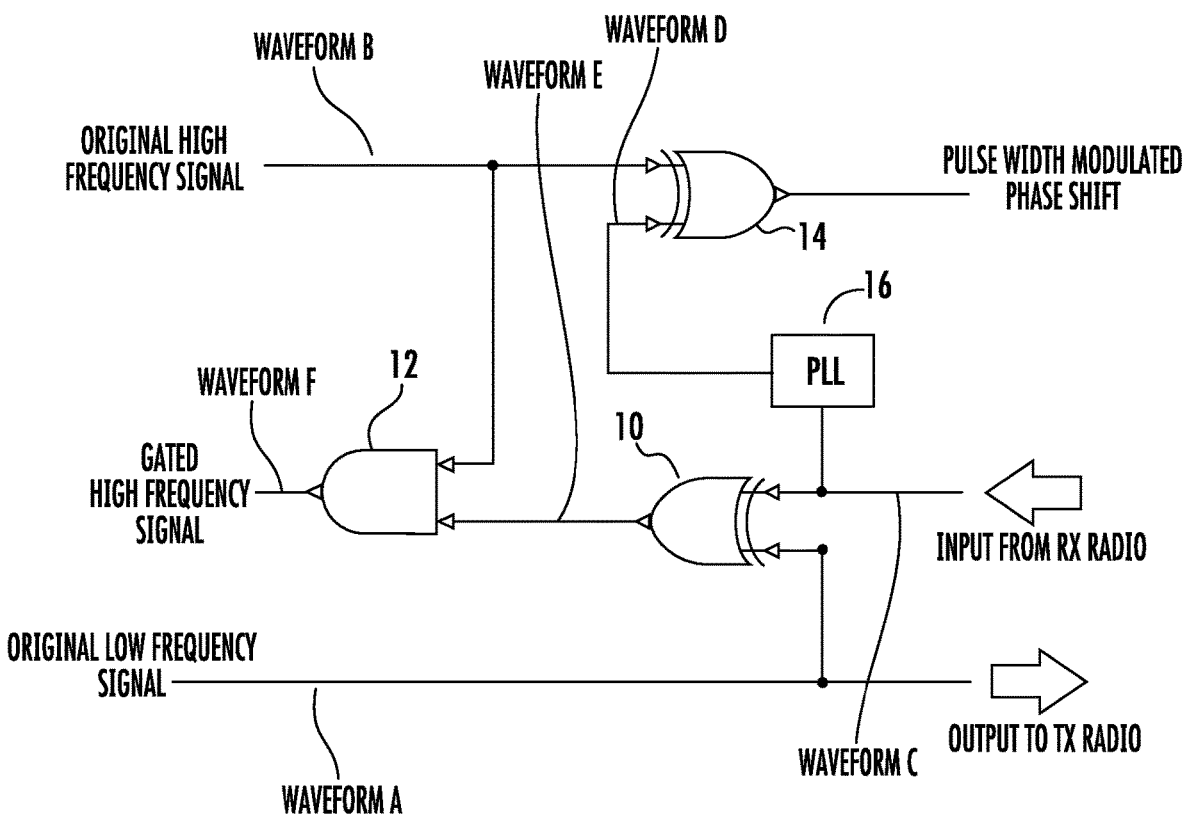
FIG. 6 is a logic circuit for deriving a signal from which distance can be determined.

One possible logic diagram for a decoder constructed from only a few logic gates is shown in FIG. 6. A wave generation circuit (not shown) generates waveform A and waveform B such that they are synchronous with each other. Signal A is sent by a radio transmitter of the originating locator node 4a to the remote locator node 4b and then returned. Exclusive OR gate 10 compares signal A to the signal that has taken a round trip. The result of the comparison is signal E, AND gate 12 uses the result of exclusive OR gate 10 to produce a series of pulses (signal F) that represent the number of times there was a 360 degree phase shift in the original high frequency and the high frequency signal generated to be synchronous with the signal that took the round trip to the remote locator node. Signal C, which took a round trip to the remote locator node is used as an input to a phase locked loop 16 to generate a new high frequency signal. Exclusive OR gate 14 compares this new signal to the original high frequency signal. The result is a pulse width modulated signal that represents the distance between the locator nodes.

Figure 7:
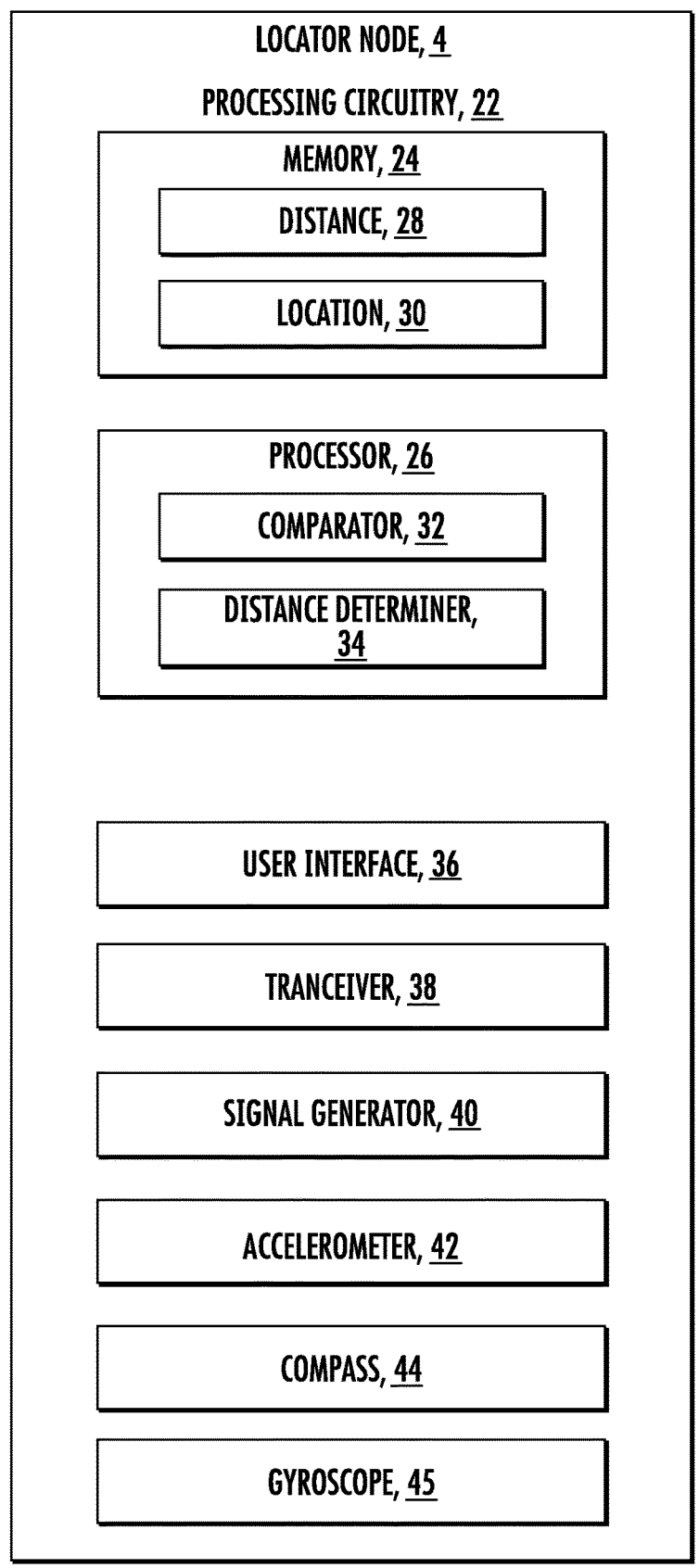
FIG. 7 is a block diagram of a locator node.

FIG. 7 is a block diagram of a locator node 4 constructed according to principles set forth above. The locator node 4 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store distance measurements 28 and locations 30 of the originating locator node 4 as well as the locations 30 of other remote locator nodes 5. The processor 26 includes or implements a comparator 32 to compare waveforms according to the XOR and AND logic described above. In an alternative embodiment, the logic of FIG. 6 is implemented using discrete components or other dedicated hardware. The processor 26 also includes or implements a distance determiner 34 which determines the distance between the originating locator node 4 and the remote locator node 5 from waveform F. As noted above, the distance is encoded in waveform F via the number of full pulses in the waveform F and the duration of any short pulse 18.

The originating locator node 4 may include a user interface 36 which may be a graphical user interface that includes a display that displays a mapping of the location of the originating locator node 4a and the remote locator nodes, 4b, 4c, etc., distributed among emergency responders at the emergency incident scene. In some embodiments, a wireless device such as a laptop used by supervisory personnel may include such a user interface 36 to enable tracking of emergency responder locations at a central or command location. Thus, in some embodiments, a system of locator nodes is deployed for use in tracking emergency responders at an emergency incident scene by determining a mapping of the positions of the emergency responders. At least one user interface is configured to display a map of the positions of the locator nodes.

The locator node 4 includes a transceiver 38 configured to transmit a low frequency signal from the first node and to receive the low frequency signal having traveled to and returned from the remote node. Thus, in one embodiment, the transceiver 38 includes a transmit antenna 6 and a receive antenna 7 as described above with reference to FIG. 2. In some embodiments, the transceiver 38 may be implemented as a separate transmitter and a separate receiver.

The locator node 4 also includes a signal generator 40 configured to generate the low frequency signal and to generate the high frequency signal. The signal generator 40 is configured so that the high frequency signal has a frequency that is a multiple of a frequency of the low frequency signal. Further, the signal generator 40 is configured so that the high frequency signal is synchronized with the low frequency signal and is phase-locked to the received low frequency signal that has made the round trip to and from the remote locator node 5. In some embodiments, the signal generator 40 may be included in the processing circuitry 22.

In some embodiments, the locator node 4 includes one or more of an accelerometer 42, a compass 44, and a gyroscope 45 to enable the locator node 4 to sense motion and heading to provide continuous updating of the position of the locator node 4 when the emergency responder to which the locator node 4 is attached is in motion.

Figure 8:
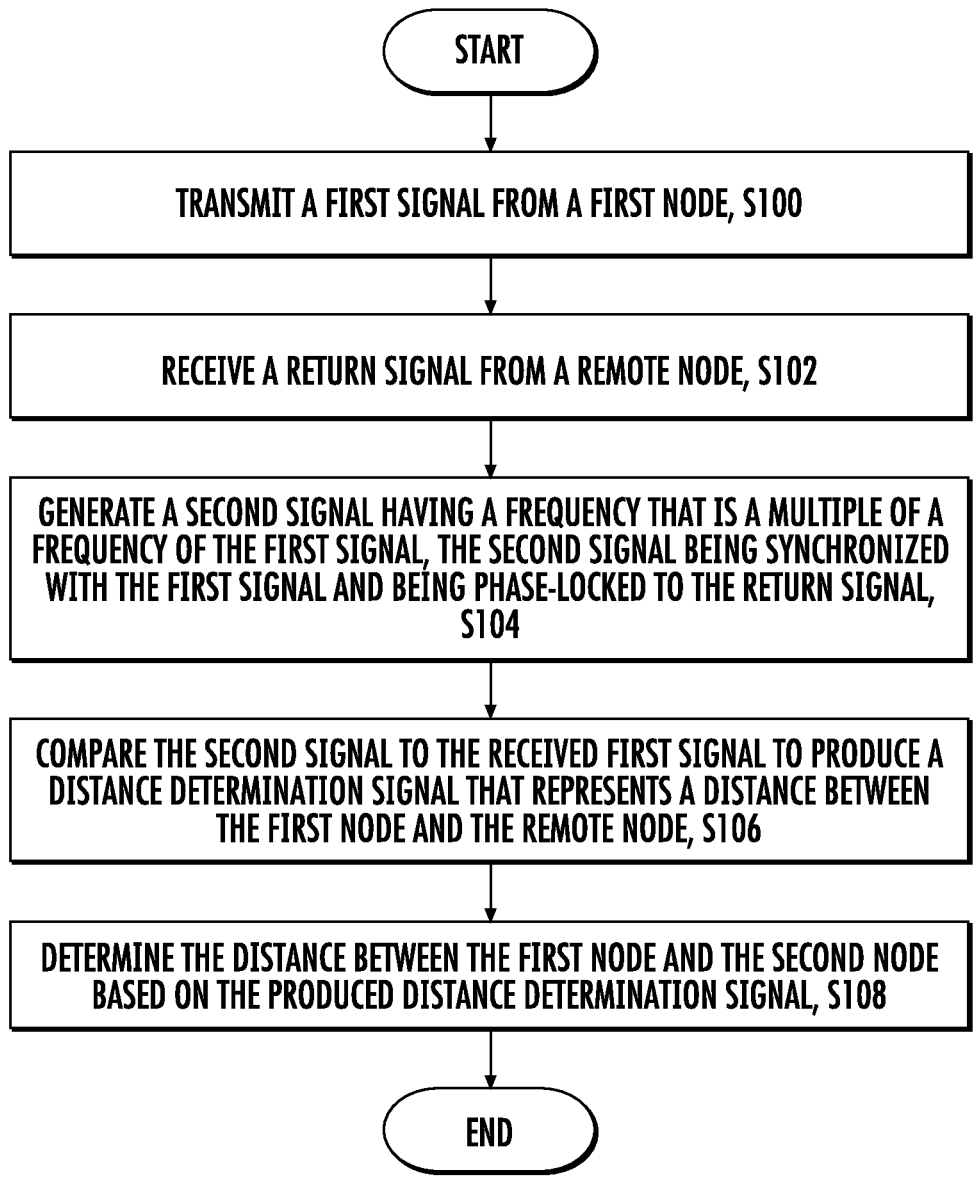
FIG. 8 is a flowchart of an exemplary process for determining a distance between two locator nodes.

FIG. 8 is a flowchart of an exemplary process for tracking emergency responders at an emergency incident scene by determining a distance between a first, e.g., originating locator node 4a and a remote locator node 4b. The process includes transmitting a first signal from the first locator node 4a (block S100). The first signal has a wavelength that is larger than a distance between the first node and the remote node. The process also includes receiving at the first locator node 4a a return signal from the remote locator node 4b (block S102). A second signal is generated (block S104). The second signal has a frequency that is a multiple of a frequency of the first signal. Also, in some embodiments, the second signal is synchronized with the first signal and is phase-locked to the received return signal. The process further includes comparing the second signal to the received return signal to produce a distance determination signal that represents a distance between the first locator node 4a and the remote locator node 4b (block S106). The distance between the first locator node 4a and the second locator node 4b is determined based on the produced distance determination signal (block S108).

A number of examples of implementations of the embodiments described herein are provided.

Example 1

Three firefighters go into a building together each with a locator node 4 and two firefighters remain outside near the entrance. As the three in the building begin to move, their locator nodes 4 create a digital map of the path that they have taken since they entered the building. The map is based on changes in the distances between each firefighter. Each locator node 4 measures the distance between itself and each other locator nodes 4 by looking at phase shift in a signal that has made a round trip between two locator nodes 4. A distance determiner 34 uses these distance measurements to figure out the location of each firefighter relative to the others. After some time in the building one of the firefighters becomes trapped. The two firefighters outside the building can see the digital map on the user interface 36 showing the path that the down firefighter took and his location relative to their location near the door. They can also see who in the building is closest to the trapped firefighter. They can use this information to plan a rescue.

Example 2

A group of firefighters arrive at a fire. Each firefighter is equipped with a locator node 4. In addition, two fire trucks equipped with locator nodes 4 and GPS devices arrive. The fire trucks become known fixed points in space. The locator node 4 on each of the firefighters tracks its position relative to the known location of the fire trucks. When a firefighter enters the building, the locator node 4 starts recording a digital map of the firefighter movements relative to the two fixed tire truck and the entrance to the building. After some time one of the firefighters runs low on air. Since his locator node 4 has been recording his history as he moved through the building, he can see a map showing his current position, the location of the exit, and the path that he took since be entered the building. He can then use this map to retrace his steps and find the exit.

Example 3

An automated factory is equipped with autonomous vehicles and robotic equipment. The automated equipment is used to move parts and assemblies through the production facility. Each one of the vehicles and mobile robots is equipped with a locator node 4. Each piece of equipment constantly tracks its position relative to the other mobile equipment in the building and creates a constantly updating digital map. This information can be used to help avoid collisions. In addition, any piece of equipment can be located in the building at any time.

Example 4

An off shore oil drilling rig is manned by a team of workers and a manager. Each person on the rig is equipped with a locator node 4. A locator node 4a is permanently attached to the north side of the oil rig and another locator node 4b is attached to the south side of the rig. The locator node 4 attached to each worker maintains a digital map showing the location of all the other workers on the rig relative to each other and the two fixed locator nodes 4a and 4b. A dangerous situation arises in one area for the rig. The manager can look at the digital map created by the locator nodes 4 and determine which workers are in danger and how best to move personal out of the danger zone. It then becomes necessary to evacuate the oil rig. The manager and rescue personal can use the constantly updating digital map maintained by the locator nodes 4 to monitor the evacuation and know when all personal have been moved to safety. If one of the workers fails to evacuate, the rescue team can see his location on the digital map.

Some exemplary embodiments include:

Embodiment 1

A tracking network for emergency personnel, comprising:
a first node, the first node having first signaling output;
a second node, the second node receiving the first signaling output and transmitting a second signaling output different from the first signaling output;
wherein the first node can measure the distance between itself and the second node.

Embodiment 2

The tracking network of Embodiment 1, further comprising a microcontroller capable of maintaining and updating location information about the other nodes in the system.

Embodiment 3

The tracking network of Embodiment 1, further comprising a local area network that allows nodes to communicate with each other.

Embodiment 4

The tracking network of Embodiment 1, further comprising a cloud based repository where each node can store location information and retrieve location information which other nodes have stored.

Embodiment 5

The tracking network of Embodiment 1, further comprising electronics capable of measuring phase shift in a modulated signal which has traveled a round trip between two nodes and computing the distance between the nodes.

Embodiment 6

The tracking network of Embodiment 1, further comprising a control system capable of allowing each node to transmit in a time slot such that it does not interfere with other nodes in the system.

Embodiment 7

The tracking network of Embodiment 1, further comprising electronics that allow a demodulated low frequency signal to be phase locked with a higher frequency such that more accurate phase shift measurements can be made.

Embodiment 8

The tracking network of Embodiment 1, further comprising an accelerometer and compass on each node.

Embodiment 9

The tracking network of Embodiment 1, further comprising a display capable of showing a map of the relative locations of all the nodes in the system.

Embodiment 10

The tracking network of Embodiment 1, wherein each node computes the distance between itself and other each other node by measuring phase shift on a modulated signal that has made a round trip between the two nodes.

Embodiment 11

The tracking network of Embodiment 1, wherein each node in the system shares it local distance measurements with other nodes in the system.

Embodiment 12

The tracking network of Embodiment 1, wherein each node in the system maps the location of other nodes in the system based on distance measurements it has taken and distance measurements provided by other nodes.

Embodiment 13

The tracking network of Embodiment 1, wherein location information is updated in real time as the nodes move relative to each other.

Embodiment 14

The tracking network of Embodiment 1, wherein each node can make use of acceleration and heading data to improve its location data.

Embodiment 15

The tracking network of Embodiment 1, wherein distances between the nodes are measured by phase shift of a modulated signal that has made a round trip between nodes.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for tracking at least one of objects, vehicles and personnel at a scene by determining a distance between a first node and a remote node, the method comprising:

transmitting a first signal from the first node, the first signal having a wavelength longer than a distance between the first node and the remote node;

receiving at the first node a return signal received from the remote node;

generating a second signal, the second signal having a frequency that is a multiple of a frequency of the first signal, the second signal being synchronized with the first signal and being phase-locked to the received return signal;

comparing the second signal to the return signal to produce a distance determination signal that represents a distance between the first node and the remote node; and determining the distance between the first node and the second node based on the produced distance determination signal.

2. The method of claim 1, wherein the produced distance determination signal has a number of pulses that represent a number of high frequency wavelengths between the first node and the remote node.

3. The method of claim 2, wherein one pulse of the number of pulses has a fractional width representing an incremental distance between the first node and the remote node the incremental distance being less than a wavelength of the second high frequency signal.

4. The method of claim 1, further comprising using the determined distance to determine a position of the first node based on known locations of the remote node and at least one other node.

5. The method of claim 4, further comprising determining an acceleration of the first node based on signals.

6. The method of claim 5, further comprising determining a heading of the first node.

7. The method of claim 6, further comprising determining an acceleration, heading and velocity of the first node based on data from an accelerometer gyroscope and compass.

8. The method of claim 1, wherein the first node is affixable to a first emergency responder and the remote node is affixable to a second emergency responder.

9. A first node for use in tracking at least one of objects, vehicles and personnel at a scene by determining a distance between the first node and a remote node the first node comprising:
    a transceiver configured to:
        transmit a first signal from the first node, the first signal having a wavelength longer than a distance between the first node and the remote node; and
        receive a return signal from the remote node;
    a signal generator configured to:
        generate the first signal; and
        generate a second signal, the second signal having a frequency that is a multiple of a frequency of the first signal, the second signal being synchronized with the first signal and being phase-locked to the received return signal; and
    processing circuitry including a memory and a processor:
    the memory configured to store a distance between the first node and the remote node;
    the processor configured to:
        compare the second signal to the received return signal to produce a distance determination signal that represents a distance between the first node and the remote node; and
        determine the distance between the first node and the remote node based on the produced distance determination signal.

10. The first node of claim 9, wherein the produced distance determination signal has a number of pulses that represent a number of high frequency wavelengths between the first node and the remote node.

11. The first node of claim 10, wherein one pulse of the number of pulses has a fractional width representing an incremental distance between the first node and the remote node the incremental distance being less than a wavelength of the second high frequency signal.

12. The first node of claim 9, wherein the processor is further configured to use the determined distance to determine a position of the first node based on known locations of the remote node and at least one other node.

13. The first node of claim 12, further comprising an accelerometer configured to determine an acceleration of the first node.

14. The first node of claim 13, further comprising a gyroscope configured to determine an orientation of the first node.

15. The first node of claim 14, further comprising a compass configured to determine a heading of the first node.

16. A system deployable for use in tracking emergency responders at an emergency incident scene by determining a mapping of the positions of the emergency responders, the system comprising:
    a plurality of locator nodes distributable among a plurality of emergency responders, each locator node configured to determine its own position and distance from at least two other locator nodes, wherein each locater node includes:
        a transceiver configured to:
            transmit a first signal from a first node, the first signal having a wavelength longer than a distance between the first node and a remote node; and
            receive a return signal from the remote node;
        a signal generator configured to:
            generate the first signal; and
            generate a second signal, the second signal having a frequency that is a multiple of a frequency of the first signal, the second signal being synchronized with the first signal and being phase-locked to the received return signal; and
        processing circuitry including a memory and a processor:
        the memory configured to store a distance between the first node and the remote node; and
        the processor configured to:
            compare the second signal to the received return signal to produce a distance determination signal that represents a distance between the first node and the remote node; and
            determine the distance between the first node and the second node based on the produced distance determination signal; and
    at least one user interface configured to display a map of the positions of the locator nodes.

17. The system of claim 16, wherein a locator node determines its position based on a distance of the locator node to a first remote locator node and a second remote locator node.

18. The system of claim 17 wherein a locator node determines a distance to a remote locator node by measuring a phase shift, the phase shift indicative of a round trip delay of a low frequency signal from the locator node and the remote locator node the measuring involving comparison of a high frequency signal and the delayed low frequency signal.

* * * * *